US010824991B2

(12) United States Patent
Lindbo

(10) Patent No.: US 10,824,991 B2
(45) Date of Patent: Nov. 3, 2020

(54) ORDER FILLING SYSTEM

(71) Applicant: OCADO INNOVATION LIMITED, Hertfordshire (GB)

(72) Inventor: Lars Sverker Ture Lindbo, Hertfordshire (GB)

(73) Assignee: OCADO INNOVATION LIMITED, Hatfield (GB)

(*) Notice: Subject to any disclaimer, the term of this patent is extended or adjusted under 35 U.S.C. 154(b) by 0 days.

(21) Appl. No.: 16/297,253

(22) Filed: Mar. 8, 2019

(65) Prior Publication Data

US 2019/0205825 A1 Jul. 4, 2019

Related U.S. Application Data

(63) Continuation of application No. 14/896,106, filed as application No. PCT/IB2014/061990 on Jun. 5, 2014, now Pat. No. 10,248,929.

(30) Foreign Application Priority Data

Jun. 6, 2013 (GB) .................................. 1310124.1

(51) Int. Cl.
G06Q 10/08 (2012.01)
B65G 1/137 (2006.01)
G06Q 30/06 (2012.01)

(52) U.S. Cl.
CPC ......... *G06Q 10/087* (2013.01); *B65G 1/1373* (2013.01); *B65G 2209/10* (2013.01); *G06Q 10/08* (2013.01); *G06Q 30/0635* (2013.01)

(58) Field of Classification Search
CPC ... G06Q 30/0635; G06Q 10/08; G06Q 10/087
See application file for complete search history.

(56) References Cited

U.S. PATENT DOCUMENTS

| 2,701,065 | A | 2/1955 | Bertel |
| 5,908,283 | A | 6/1999 | Huang et al. |
| 6,721,762 | B1 | 4/2004 | Levine et al. |
| 8,032,391 | B2 | 10/2011 | Erie et al. |
| 9,230,233 | B1 | 1/2016 | Sundaresan et al. |
| 2002/0178074 | A1 | 11/2002 | Bloom |
| 2009/0299521 | A1 | 12/2009 | Hansl et al. |

(Continued)

FOREIGN PATENT DOCUMENTS

| DE | 102009023808 A1 | 12/2010 |
| EP | 0767113 A2 | 7/1997 |

(Continued)

OTHER PUBLICATIONS

International Search Report (PCT/ISA/210) dated Oct. 13, 2014, by the European Patent Office as the International Searching Authority for International Application No. PCT/IB2014/061990.

(Continued)

*Primary Examiner* — A. Hunter Wilder
(74) *Attorney, Agent, or Firm* — Buchanan Ingersoll & Rooney PC

(57) ABSTRACT

Systems, methods, and machine-executable coded instruction sets for the fully- and/or partly automated handling of goods are disclosed. In particular, the disclosure provides improvements in the handling of goods in fulfillment of orders for items of mixed sizes, weights, and other dimensions.

20 Claims, 8 Drawing Sheets

(56) References Cited

U.S. PATENT DOCUMENTS

| | | | |
|---|---|---|---|
| 2013/0223959 A1 | 8/2013 | Koholka | |
| 2013/0247519 A1* | 9/2013 | Clark | B65B 59/00 53/452 |
| 2014/0279272 A1* | 9/2014 | Inman | G06Q 30/0635 705/26.81 |

FOREIGN PATENT DOCUMENTS

| | | | |
|---|---|---|---|
| EP | 1452462 | A2 | 9/2004 |
| JP | 106127611 | A | 5/1994 |
| WO | 2006042347 | A2 | 4/2006 |
| WO | 2012069327 | A1 | 5/2012 |

OTHER PUBLICATIONS

Written Opinion (PCT/ISA/237) dated Oct. 13, 2014, by the European Patent Office as the International Searching Authority for International Application No. PCT/IB2014/061990.

\* cited by examiner

ORDER FILLING SYSTEM

CROSS-REFERENCE TO RELATED APPLICATIONS

This application claims priority to UK Patent Application No. 1310124.1 filed on Jun. 6, 2013, the entirety of which is hereby incorporated by reference.

FIELD OF THE INVENTION

The disclosure herein relates to systems and methods for handling items processed by at least partially-automated order processing and fulfillment systems.

BACKGROUND OF THE INVENTION

Some forms of both fully- and semi-automated order processing and fulfillment systems are known. They, and the components they comprise, may take many forms. As one example, U.S. Pat. No. 2,701,065, describes handling and storing of goods stored in containers stacked in freestanding rows. Another example is shown in EP 0767113 (Cimcorp™), where a mechanism for removing a plurality of stacked bins using a robotic load handler in the form of a rectangular tube which is lowered around bins and is able to grip a in at any level is described.

There is need, however, for improvements in the efficiency of such systems. For example, the efficient pre-packing, or staged packing, of containers containing multiple items of an order can lead to efficiencies in the subsequent handling of such orders, both within an order fulfillment system and during subsequent transportation and distribution. For example, it has been observed that controlling the order in which items are packed can have a significant effect on the number of items that can be packed into a shipping container such as a box, and on the distribution of weight between containers that make up multi-container orders. Efficiencies can be realized in the time required for handling of orders, as well as costs associated with operation of fully- and semi-automatic order processing systems. Costs can be minimized, for example, in the use of warehouse space, efficiency and wear and tear on different moving components, etc., by sorting items according to size prior to or during packing.

In view of such shortcomings it would be advantageous to provide, among other things, systems and methods for the improved picking and storage of items included in such orders.

SUMMARY OF THE INVENTION

Fully- and semi-automatic goods storage and retrieval systems, various aspects of which may sometimes be referred to as "order fulfillment," "storage and retrieval," and/or "order picking" systems, can be implemented in a wide variety of types and forms. One manner of providing access to goods stored for fully- and/or semi-automatic retrieval, for example, comprises placement of goods, which may be of any desired type(s), in bins or other containers (hereinafter referred to generically as bins), and stacking and/or otherwise disposing the bins vertically in layers, and optionally in multiple columns and/or rows, such that individual bins may be accessible by wholly or partially-automated bin retrieval systems. Such systems can for example comprise various combinations of bins; bin stack support mechanisms, which may include mechanical devices such as frames and/or free-standing, stackable, and/or otherwise specialized bin(s); and automated or semi-automated (i.e., "robotic") retrieval devices, such as load handlers which may for example operate on grids or other forms of rails, using wheels, and/or on other forms of mechanical traveling devices.

In various aspects, the disclosure herein provides systems, methods, and corresponding machine-executable coded instruction sets for the fully- and/or partly automated handling of goods. In particular, the disclosure provides improvements in the handling of goods in fulfillment of orders for items of mixed absolute or relative sizes, weights, and/or other dimensions.

For example, in one aspect the disclosure provides methods of handling items in at least a semi-automated order fulfillment system. Such methods comprise identifying relatively bulky items; storing at least one identified bulky item in at least one bin or other container, prior to storing any relatively less bulky item therein, to form a pre-packed container; and placing the pre-packed container in low-cost or otherwise-segregated storage. Upon receipt of an order comprising a request for the at least one pre-packed bulky item and at least one non-bulky item, such methods can include retrieving the pre-packed container; using an order picking system, enabling or otherwise providing for adding the at least one non-bulky item to the pre-packed container and providing the pre-packed container comprising the at least one non-bulky item for dispatch to the customer.

In various embodiments, such aspect(s) of the invention can include storing a plurality of identified bulky items in a single bin or other container to form a pre-packed container. Such pluralities can for example include multiple, substantially identical items, and/or combinations of large but relatively lighter items, and relatively heavier items.

In another aspect, the invention provides order fulfillment systems which comprise, among other features and components, one or more segregated storage facilities, for storage of bins each comprising one or more pre-packed bulky items pending picking of an order comprising at least one item stored in a non-segregated facility; and one or more retrieval and picking systems adapted to retrieve the pre-packed bins and add to them, for storage therein, additional items from a storage grid, and to deliver packed bins comprising bulky and other items to a dispatch facility for delivery to customers, etc. Such facilities may be segregated from storage used for other items in any desired form and manner. For example, such storage may be physically separated from other storage, as for example by provision of an entirely separate free-standing or other stacked storage, shelving system, etc.; and/or it may be logically segregated from other storage by, for example, being located in one or more regions within a storage grid that are associated with reduced or otherwise relatively lower operational, maintenance, or real estate cost(s).

In various embodiments, it can be advantageous for all or one or more portions of such systems to be refrigerated, heated, and/or otherwise environmentally controlled (e.g., to control dust, etc.)

In further aspects, the disclosure provides systems and logic structures such as coded, machine-executable instruction sets suitable for use in implementing such staged order picking/packing methods. Control of such fully and/or semi-automatic order picking systems, and particularly of such robotic load handlers, can be accomplished through the use of various forms and combinations of suitably configured sensors, controller mechanism(s), and processor(s) operating according to programmed control logic in the form or software, firmware, etc.

In various aspect, the disclosure provides 1 an order fulfillment system comprising: a facility placing pre-picked bulky items in containers; a storage facility, for storage of bins each comprising one or more pre-picked bulky items pending picking of an order comprising at least other one item stored in a storage and retrieval system; and a retrieval and picking system adapted to retrieve pre-packed bins and enable placement therein of one or more additional items from the storage and retrieval system, and to deliver packed bins comprising the bulky and at least one other item to a dispatch facility.

In some embodiments, the order fulfillment system includes at least one processor configured to: determine whether any of a plurality of incoming items will be pre-picked at the facility placing pre-picked bulky items in containers based on received or accessed information associated with the incoming items.

In various aspects, the disclosure provides a method of handling items in at least a semi-automated order fulfillment system. The method includes: identifying bulky items for pre-packing; storing at least one identified bulky item in each of at least one bin, prior to storing any relatively less bulky item therein, to form at least one pre-packed container; placing the at least one pre-packed container in storage; and, upon receipt of an order comprising a request for the at least one pre-packed bulky item and at least one non-bulky item; retrieving one of the at least one pre-packed containers; using an order picking system, adding the at least one non-bulky item to the retrieved pre-packed container; and providing the retrieved pre-packed container comprising the at least one non-bulky item to a dispatch facility.

In some embodiments, identifying the bulky items for pre-packing is based on at least one physical characteristic of an item, and on a predicted demand for the item.

BRIEF DESCRIPTION OF THE DRAWINGS

The invention is illustrated in the figures of the accompanying drawings, which are meant to be exemplary and not limiting, and in which like references are intended to refer to like or corresponding parts.

DESCRIPTION OF EMBODIMENTS

Preferred embodiments of methods, systems, and apparatus suitable for use in implementing various aspects of the invention are described through reference to the drawings.

Figure 1A:
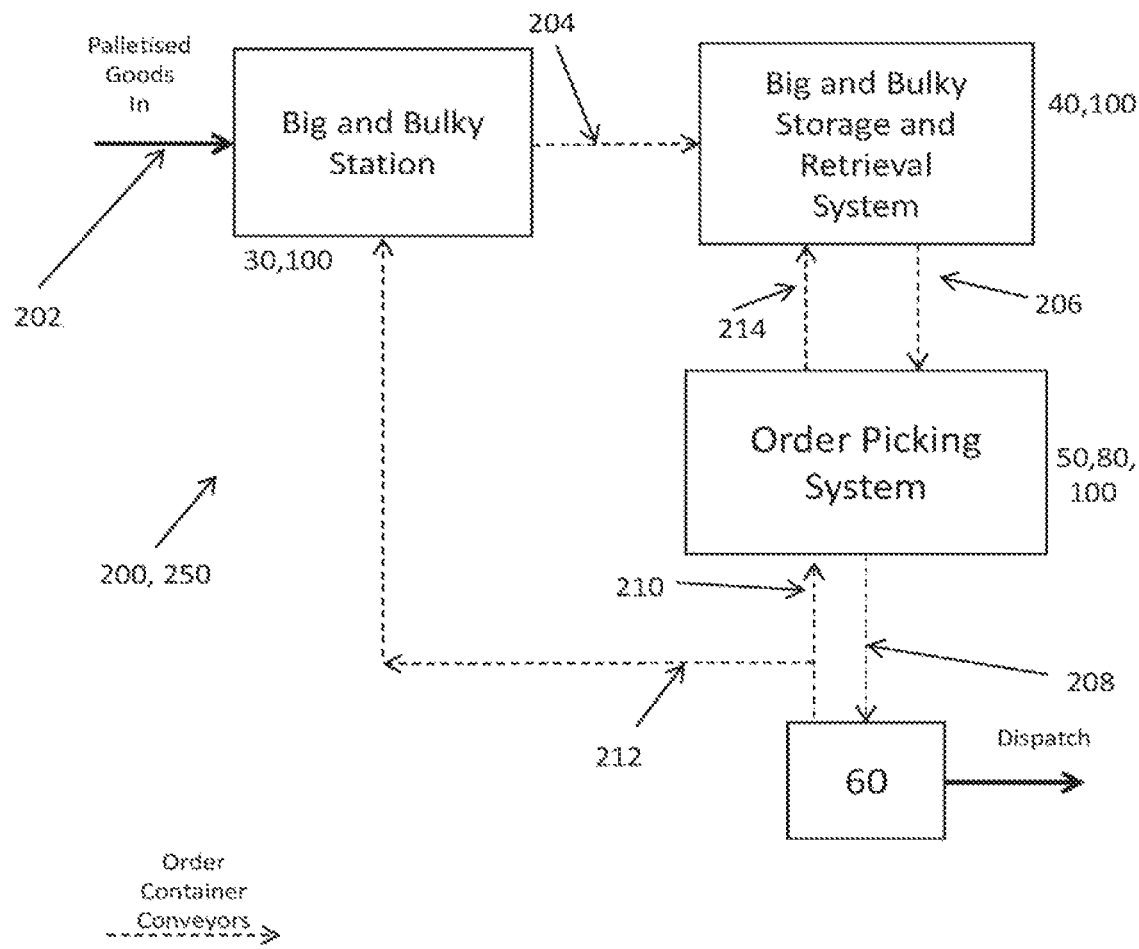
FIGS. 1a and 1b are schematic flow diagrams illustrating processes and systems suitable for use in implementing aspects of the invention.
Figure 1B:
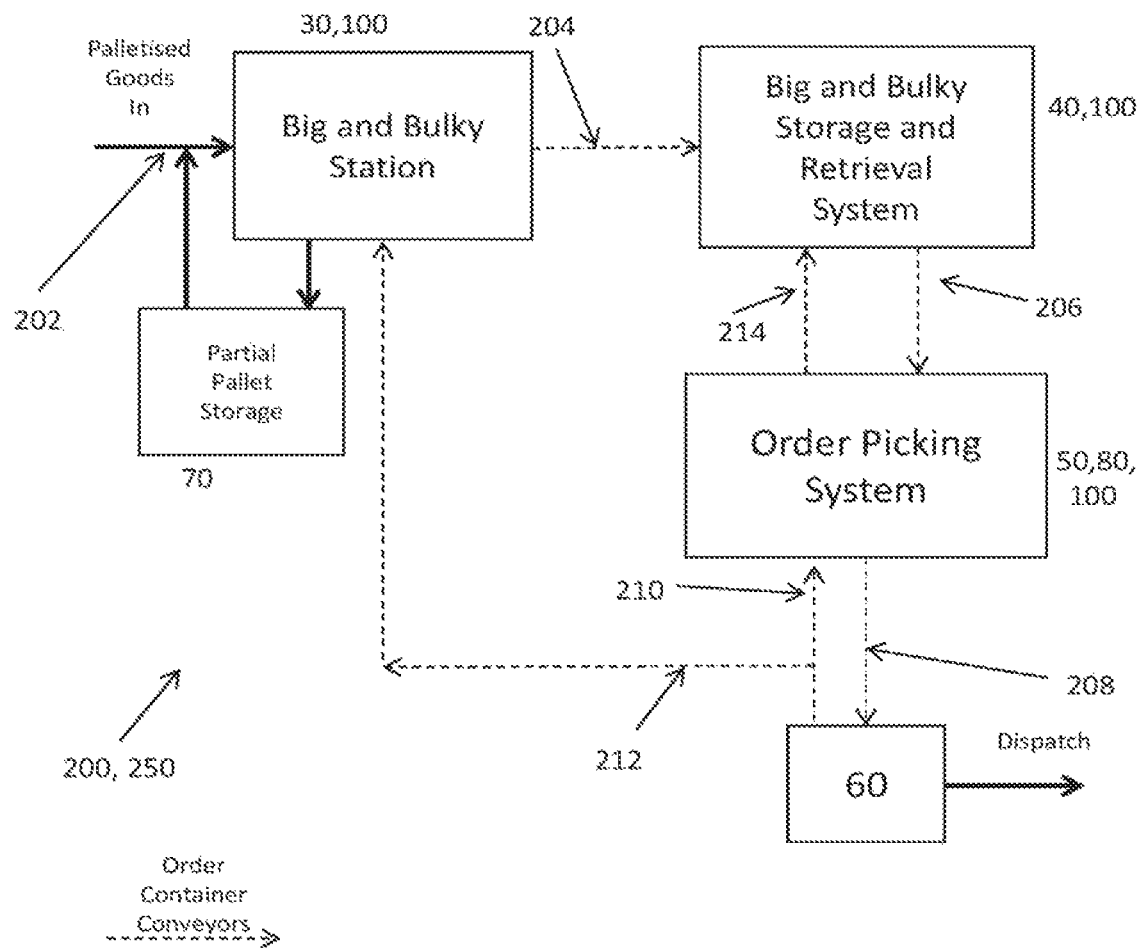

FIGS. 1a and 1b show example processes 200, and aspects of systems 250, suitable for use in processing orders in accordance with the disclosure. In the embodiments shown, system(s) 250 comprise (sub)systems 100 which include big & bulky pick station 30, storage and retrieval system 40, and order picking system 50, as well as dispatch facility 60. In the embodiment shown in FIG. 1b, system 250 further comprises a partial pallet storage facility 70.

Order processing system(s) 250 and process(es) 200 suitable for use in implementing the disclosure herein can be configured in a wide variety of ways, using many different types of devices and processes. Various types of sorting, storage, picking, delivering, and/or other item handling systems and processes can be used, for example. Moreover, such systems and processes may be used for the sorting, storage, and delivery of any type(s) of commodities, including for example groceries and/or other office, household and consumer items.

Principles of the invention may be applied with particular advantage to the semi- and/or fully-automated fulfillment of orders. Such orders can, for example, include orders entered via the Internet and/or other public and private communications networks.

In a typical commodities picking operation adapted for handling a large variety of items, such as a grocery order processing system, it is sometimes found that a wide range of item sizes, shapes, weights, and dimensions must be accommodated, and that some portion(s) of the items to be sorted, stored, delivered, and/or otherwise handled are of relatively large and/or otherwise bulky or clumsy nature(s), and occupy disproportionate amounts of space and weight in storage and in assembled orders. For example, it has been observed that in some grocery picking operations, perhaps 1-2% of the item range consists of products which take up twenty percent (20%) or more of the total volume ('cube') and/or weight of assembled order(s). Such items can include, for example, packages of kitchen and household paper, diapers, multipacks of large bottles of water, soft drinks, and the like.

It can be advantageous, in assembling or "picking" orders that include such relatively large or bulky items, as well as relatively smaller or otherwise more normally-manipulated items, to pick the relatively bulky items first, or in multiple stages, and place them into order containers before smaller or otherwise less bulky items. Such pre-packaging can accelerate the picking process, improve efficiency in the use of space within shipping or delivery containers, and reduce the risk of product damage. Resultant increases in efficiency can be significant. In example scenarios, it has been shown that picking bulky items into delivery containers first can increase the pick productivity of these items by over 200% while reducing product damages by as much as 20%.

It can further be advantageous, in implementing systems and methods in accordance with the invention, to apply such picking and pre-packaging of relatively large or bulky items to subsets of larger item ranges to be handled by a general order picking system 100, 250. For example, in a fully- or partially-automated storage and retrieval system 100, 250 adapted for use with groceries and other household/consumer items, it can be advantageous to identify the 50-400 most popular "big & bulky" items from a larger range of items (often including thousands, or tens of thousands of distinct items and types of items) processed by the system 100, 250 and pack one or more of each of those big & bulky items into each of a plurality of bins 1. In some example operations, it has been observed that over 40% of orders can contain at least one bulky item.

In very broad aspects, the present disclosure relates to any staged system(s) or process(es) whereby pre-packing is used to improve or simplify the control of orders in which items of multiple sizes, shapes, and/or weights are packed. In particular, such system(s) and process(es) can include pre-packing bulky items, items requiring special handling or environmental conditions, frequently ordered items, fragile items, or any other items for which pre-packing can provide an advantage, into containers used for assembling and optionally shipping multi-item orders, and placing the pre-packed containers in relatively low-cost or otherwise relatively more efficient storage.

As will be understood by those skilled in the relevant arts, big, large, and/or otherwise bulky (hereinafter all "bulky") items 22 may be defined in relative terms, in comparison with other items and types of items processed using an order picking system 50, 100, 250 etc.; in comparison to bins or other containers to be used in conjunction with the items; and/or to physical and/or logical capacities of pickers or other systems to be used in handling the items. For example, such bulky items 22 may be defined in terms of relative weight, volume, and/or maximum dimension(s), relative to other items stored and/or retrieved by a system 50, 100, 250 and/or relative to bins 1 used by such a system, and/or the carrying or lifting capacity of an automated item handler such as an order picker.

In some examples, a bulky item may be additionally or alternatively defined or identified with respect to absolute terms, for example, if the item is over 5 kg in weight, is over 8000 cubic centimeters in volume, and/or is over 100 cm in its longest dimension.

For purposes of this disclosure, bulky items include items having any one or more dimensions or characteristics that make an item inconvenient or otherwise inappropriate for handling by any one or more components of an order picking system, including for example one or more greatest linear dimensions (e.g., length, width, height), volume, and/or weight.

In the embodiments shown in FIGS. 1a and 1b, order processing system(s) 250 suitable for use in implementing the invention include Big & Bulky pick station(s) 30, storage and retrieval system(s) 40, and order picking system(s) 50, among other components. While various aspects of the process(es) and system(s) shown in FIGS. 1a and 1b are illustrated using separate functional or schematic boxes, it is to be understood that, in various embodiments, physical, logical, and other aspects 100 of the system(s) and function(s) depicted can be combined or otherwise shared in a wide variety of forms. For example, storage and retrieval system(s) 40, 100 and order picking system(s) 50, 100 may comprise parts or functions of a combined or composite storage and retrieval system 100, 250; Big & Bulky pick station(s) 30, 100 can be incorporated as physical or logical parts of such combined system(s) as well.

Figure 2:
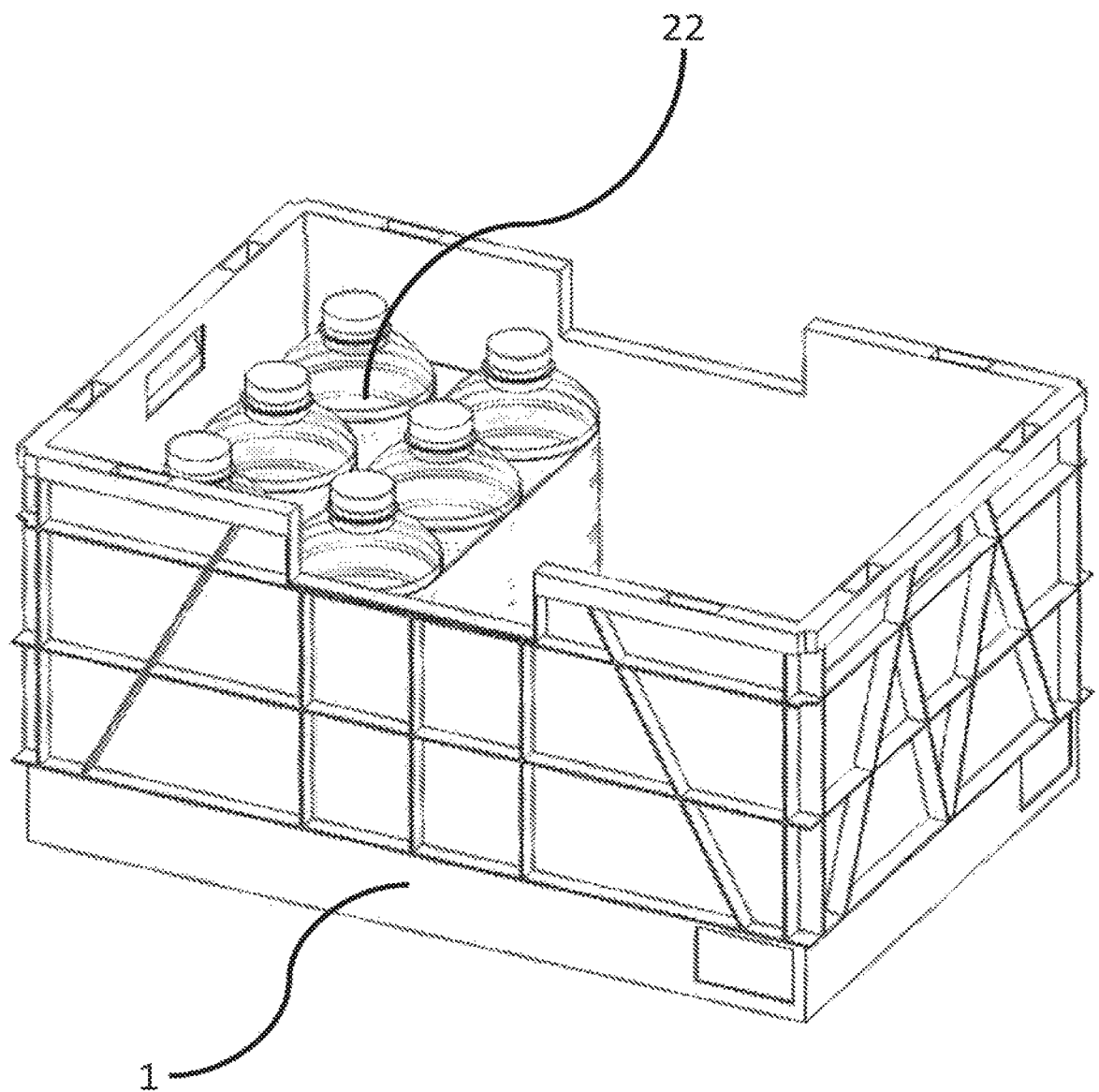
FIG. 2 is a schematic diagram showing devices suitable for use in implementing aspects of the invention.

Big & Bulky pick station(s) 30, 100 and associated process(es), can provide any aspect(s) of order processing system(s) 250 that enable pallets and/or other multi-packs of bulky items to be separated and placed, or "picked," individually or in groups, into separate delivery bins. FIG. 2 shows an example of a bulky item 22 that has been pre-picked into a bin 1. In various examples, as noted, the pre-picking and temporary storage of bulky items, preferably in low-cost and/or otherwise efficient storage facilities, can provide improvements in efficiency in fully or semi-automated order handling processes.

Pre-picking of bulky items 22 into bins 1 can be performed using any suitably-configured fully or semi-automated systems, using for example various type(s) robotic devices, or can be performed manually by human workers. In various embodiments, a Big & Bulky pick station 30 can include single or plural pick stations wherein one or more palletized bulky item sets are picked and placed into initially empty bins.

System(s) 250 can include or otherwise cooperate with automated and/or manual systems for bringing palletized or other bulky items packed in quantity to the pick station. In some examples, an entire pallet or quantity of bulky items can be picked into bins at one time. In some examples, picking an entire pallet or large quantities of items can simplify inventory processes or can increase efficiency.

As shown at 70 in FIG. 1b, in some circumstances, it may be beneficial to pre-pick less than full pallets of bulky items 22. For example, for bulky items 22 which do not sell as quickly as other items, or which may otherwise be stored in Big & Bulky storage and retrieval system(s) 40, 100, it may be more efficient to pick only enough bulky items to fulfill the estimated orders for a determined number of days. Partial pallets or groups of items can be stored in partial pallet storage 70. Partial pallet storage facility(ies) 70 can include any storage facility suitable for holding partially picked pallets. In some examples, determining whether to pick and store partial pallets can be based on relative costs of pallet and bin storage and movement in partial pallet storage 70 and in storage and retrieval system(s) 40. By enabling partially-picked pallets in storage facility(ies) 70 that impose relatively lower costs on a system 250 and/or its operator(s) than storage within a grid of a storage and retrieval system 40, 100, for example, use of such facility(ies) 70 can reduce overall operational costs of a system 250 and/or otherwise increase efficiency thereof.

Big & Bulky storage and retrieval (sub)system(s) 40, 100 can include any machine(s), device(s), infrastructure or arrangement(s) suitable for automatically and/or manually storing and retrieving bins containing one or more pre-picked bulky items 22. For example, such system(s) can be combined with storage and retrieval system(s) 100 used for storing, retrieving, and/or otherwise handling non-bulky items commonly processed with the pre-picked bulky items. In such embodiments it may be advantageous, for example, to pre-pick bulky items 22 into bins or other containers 1 that will be used in later order processing, and stored in common with similar containers containing non-bulky items in a grid 2 such as that shown in FIG. 3 and described below. Big & Bulky storage and retrieval system(s) 40 can be implemented using systems such as Knapp OSR™ systems, Dematic Multishuttle™, or a mini-load system(s). In another example, Big & Bulky storage and retrieval system(s) 40, 100 can be implemented using Autostore™ or Cimcorp™ stacked bin or similar system(s). In yet another example, Big & Bulky storage and retrieval system(s) 40 can include flow rack(s) or manual racking process(es), and can include rollers for storing and retrieving pre-packed bins.

Big & Bulky storage and retrieval system(s) 40 can improve operational costs and efficiencies of order processing and fulfillment system(s) 100, 250 by providing for temporary storage of pre-picked items 22 and bins 1 in locations or facilities associated with relatively low operational and/or infrastructure costs. For example, pre-picked bins 1 can be stored in physically separate areas in a warehouse, and/or in logically separate areas within a system or subsystem 40, 100, 250. Such areas may be subject to lower rent costs, be out of the way of processing traffic, and/or otherwise help to reduce inefficiencies in access to central or higher traffic areas of storage and retrieval system(s) 40, 100.

In some example embodiments, the size and/or weight of the bulky items may limit the number of bulky items can be accommodated in each bin. Accordingly in such examples, when bulky items are stored within the storage and retrieval system 40, 100 in bins, the bulky items may require a large number of storage bins and/or storage locations within the storage and retrieval system in order to maintain a desired level of easily accessible inventory within the system. Conversely, in examples where fewer bins are used to store bulky items in the storage and retrieval system, the system may require more frequent restocking of the bulky items. Retrieving bins containing bulky items for picking into destination containers, and/or more frequent restocking may inherently require more bin movement.

In some example situations, the systems and methods described herein may improve efficiencies by reducing the amount of bulky items required to be stored and/or retrieved from a general area within the storage and retrieval system. In some examples, this may reduce the amount of storage space utilized by bulky items in one or more aspects of the system(s), reducing container movement, and/or reducing backlogs or idle times for containers or automated devices. A reduction of storage, movement, backlogs, and/or general use of a system may, in some examples, reduce wear and tear on any mechanical parts or any areas susceptible to friction, and may reduce traffic and work loads of bin retrieval devices thereby improving efficiency of the system as a whole. In some example scenarios, pre-picking commonly requested bulky items in destination containers reduced work loads of bin retrieval devices by as much as 8%.

In a zone picking system 80, it may be beneficial to provide balanced workloads between pick stations 84, and/or to maintain minimum workload levels at each station. In conventional systems, this may involve providing palletized goods from one side of the conveyors 82 and smaller non-palletized goods from the other side. In this configuration, it can be very difficult to ensure that all the big and bulky items are picked first. It can also be very difficult to provide enough workload to each pick station to fully utilize the capacity of the pick stations. By pre-picking big and bulky items according to the present invention, it may in some cases be possible to increase work station utilization by as much as 12%.

Figure 4:
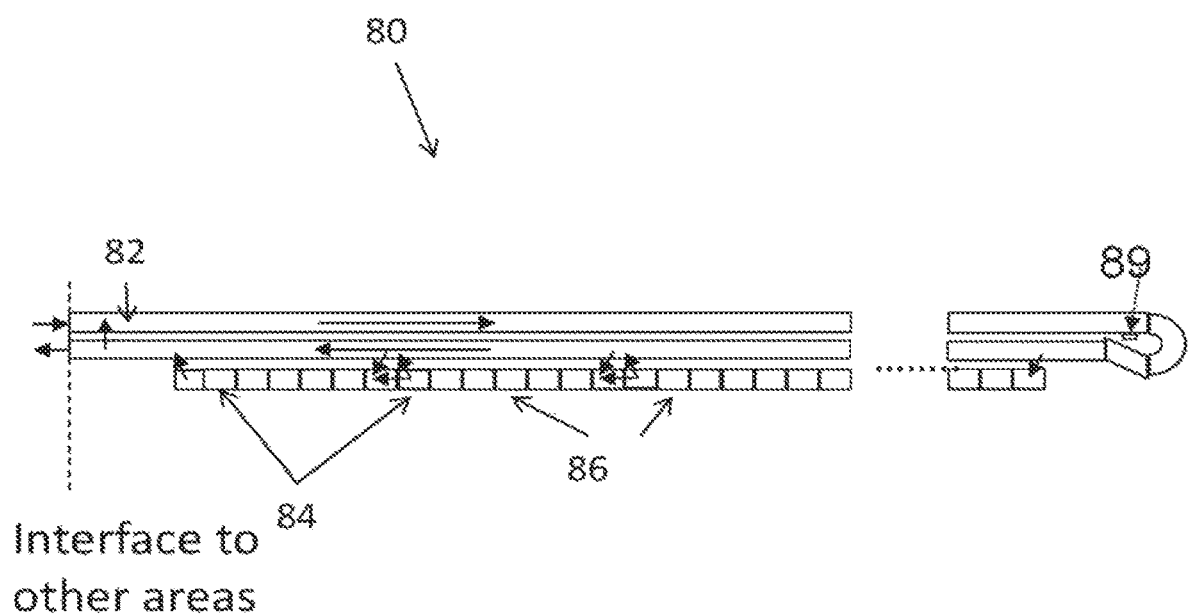
FIG. 4 is a schematic diagram showing aspects of an embodiment of an order picking system suitable for use in implementing the invention.

Order picking system(s) 50 can include any types, forms, or aspects of an order processing system 250 involved in picking items to process in order with pre-picked bin/container combinations 1, 22. For example, as shown in FIG. 4 (and described below) such order picking system(s) 50 can include conveyor pick system(s) such as a goods-to-man picking system(s), trolley pick system(s) wherein pre-picked bins 1 can be loaded on a picking trolley before being transported through an area to pick other product on shelves or in bins, etc. Examples of goods-to-man picking systems suitable for use in implementing such aspects of the invention include shuttle based systems (for example, a Knapp OSR™ system or Dematic Multishuttle™), mini-load based systems, stacked-bin systems, (for example, Autostore™ or Cimcorp™), or other suitable systems.

Referring to FIGS. 1a and 1b, in a process 200, at 202 items 22 identified as bulky arrive at Big & Bulky pick station 30. For example, pallet(s) of multi-packed bulky items may be removed from a truck or other means of conveyance at an order processing/fulfillment center, and be wheeled into one or more pick station(s) 30 comprising tables for holding a plurality of bins 1. Upon removal or opening of any packaging, at station 30, single items 22 of bulky product(s) may be pre-picked, one or more into each bin 1 or other order container, until all desired items are picked.

At 202, as mentioned, relatively large and bulky items may be brought, as for example on pallets and/or other containers, to a designated location which can be considered to form a part of, or to be otherwise associated with, an order picking system 50, 100, as described above. Such a location may be designated as a big and bulky pick station 30. For example, in many grocery and/or other consumer goods systems, bulky items 22 may be delivered in lots of approximately 100 items on pallets.

As desired pre-picking of each bin 1 is completed, at 204 the pre-picked bin 1 containing one or more bulky items 22 may be transferred to storage in a storage and retrieval system 40, 100, and stored therein until needed for fulfillment of an order.

Figure 3:
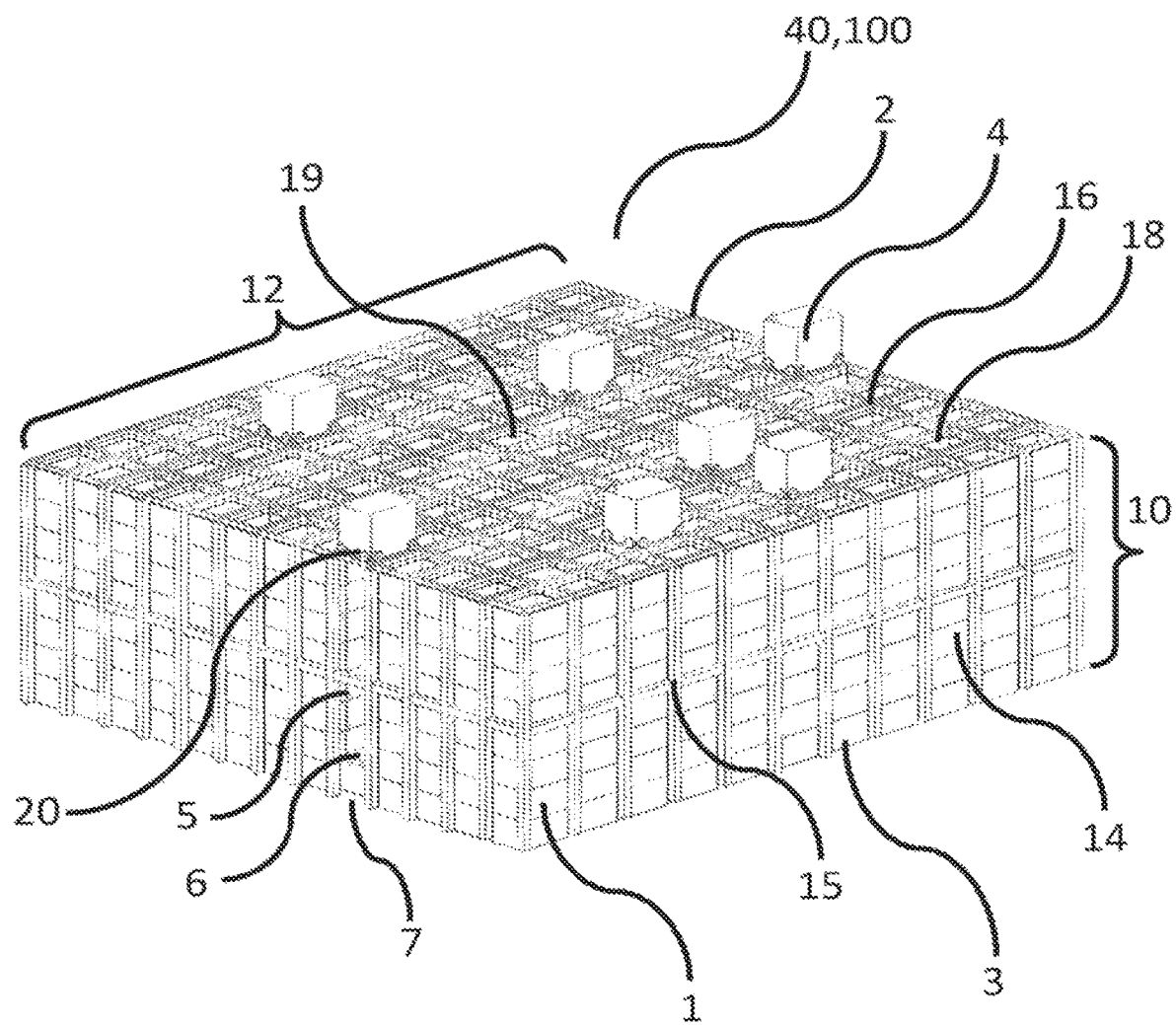
FIG. 3 is a schematic diagram showing aspects of an embodiment of a storage and retrieval system suitable for use in implementing the invention.

An example of a goods storage and retrieval system 40, 100 suitable for use in implementing aspects of the disclosure is shown schematically in FIG. 3. In the embodiment shown, system 100 comprises a grid 2 of containers 1 such as bins 1 suitable for storage of any desired type(s) of goods, including both bulky and/or non-bulky items. Bins 1 are stored in multi-layer stacks 3, any or all portions of which stacks 3 can be lifted, removed, or otherwise manipulated by retrieval device(s) such as moveable load handler(s) 4.

In various embodiments, a grid 2 associated with a system 100, 50 of the type shown in FIG. 2 may comprise any desired number(s) of stacks 3 of bins 1, in the form of boxes, baskets, pallets, and/or other containers 1.

Stacks 3 of bins 1 may be provided in multiple rows 10 and/or columns 12, and may comprise any desired and/or otherwise suitable numbers of layers 14. Such stacks may be free standing, using for example interlocking, cooperating, and/or other suitably-configured bins 1, and/or may be supported by suitably-configured frames, struts, brackets, and/or other structural supports 15.

Like system(s) 50, 100, etc., bins 1 may be of any type(s) suitable for use in implementing the objects described herein. In some preferred embodiments, bins 1 used for pre-picking and temporary storage of items 22 are of the same type(s) used by system(s) 250 for subsequent picking of non-bulky and other items 22, and for delivery to a dispatch facility 70 and optionally for final delivery to a customer.

Bins or containers 1 stored in a grid 2 in such a system may be moved, stored, retrieved, and/or otherwise handled by robotic or otherwise moveable load handler(s) or shuttle(s) 4. Such load handlers can navigate a grid 2, in order to deposit, remove, relocate, open, and/or otherwise access individual bin(s) 1 by any suitable means, including for example rails 16, cables, tracks, cranes, or other support(s), which may be attached to and/or otherwise cooperate with support frames 15, if any, in supporting any or all of grid 2. Navigation of load handler(s) 4 may be fully, partly, or non-automatic, i.e., autonomous. Full, partial or non-autonomous control of load handler(s) 4 may be accomplished through the use of any suitable control devices, including sensors, controls, and machine-executable instruction logic.

In the embodiment shown in FIG. 3, load handlers 4 comprise grippers and/or other devices 6 to connect to and/or otherwise engage bins 1, and hoists 5 to lift one or more bins of a stack or column 3 for accessing bins therein, or below.

In such a system 250, at 204 a bin 1 comprising a desired number of pre-picked item(s) 22 may be brought to a port 7 for storage in a grid 2 until needed for completion of further order-fulfillment process(es). For example, at big & bulky picking station 30, such pre-picked bins may be placed on a conveyor, and carried to a port 7 on a belt. At port 7, bin(s) 1 may be engaged by load handler 4 at a location 20 using, for example, a mechanical, hydraulic, or electrical-mechanical gripper, and hoisted above the grid 2. The load handler 4, by operating on a grid or network of rails 16, may take the bin 1 to a storage point 18 within the grid, and store the bin there in a stack 3 until needed for further order fulfillment processes.

When it is subsequently determined that a bin 1 containing one or more pre-picked bulky items 22 is needed for further order fulfillment processes, at 206 that bin 1 may be retrieved from the storage and retrieval system 40, 100 and delivered to an order picking system 100, 50.

For example, in a system 250 comprising a storage and retrieval system 50, 100 of the type shown in FIG. 3, at 206 a bin 1 identified as needed, or otherwise desired, for fulfilling an order may be retrieved from a storage point 18 in the storage and retrieval system 40, 100 by a load handler 4, and transported to the same or another intake/delivery port 7. At port 7, the bin 1 can be lowered to or otherwise placed on a conveyor 52 or other conveyance for delivery to an order picking (sub)system 50, 100, and taken there.

An example of an order picking system 80 suitable for use in implementing aspects of the disclosure is shown schematically in FIG. 4. In the embodiment shown, system 100 comprises a zone picking system having a plurality of conveyors 82 configured to transport both empty bins 1 and bins 1 comprising pre-picked bulky items 22 to a plurality of picking stations 84. As pre-picked and optionally other bins 1 are carried from pre-picked storage 40 or elsewhere to picking stations 84, for example, they can pass a scanner or other machine-reading device 89, where a barcode, QR code, RFID tag, NFC tag, or other device may be read, and data recorded thereon can be interpreted to determine which pick station 84 each bin 1 is to be delivered to. Thereafter the bins 1 can be delivered to pre-pick buffers 86, until a robotic, human, or other picker located at a picking station 84 is ready. At picking stations 84, pre-picked and other bins 1 may be packed with items available at the picking station 84.

At 208, individual bins 1, or sets thereof comprising parts or entireties of customer orders which have been efficiently filled, or packing thereof is otherwise deemed complete, may be transported, via conveyor, forklift, or other means, to a vehicle loading or other delivery point 60, for dispatch to any ordering customer(s). For example, in a system 250 comprising a picking station such as that shown in FIG. 4, bin(s) 1 that have been filled with all desired bulky and/or non-bulky items 22 may be moved by conveyor or other device, for delivery to a dispatch facility 60 or other desired location.

At dispatch facility 60, all packed bins 1 associated with one or more assembled orders may be delivered to a transport means, such as a truck, or otherwise delivered to, or made ready for delivery to, customer(s) or other agents associated with the order(s). It should be understood that providing a container for dispatch can include queuing or otherwise identifying the container as being ready for shipment, and does not necessarily include the actual loading or shipment of the container.

At 210, returned and/or otherwise emptied bins 1 can be returned to the order picking system 50, 100, for storage and/or further use as desired, and/or at 212 they may be returned to a big & bulky pick station 30 for such further use in pre-picking bulky items as described above.

As previously noted, and as will understood by those skilled in the relevant arts, significant savings in costs and other improvements in efficiency can be realized by providing bulky picking system(s) 30 and/or storage and retrieval system(s) 40 as separate subsystem(s), components, or facilities of systems 100. For example, operations involving the lifting, accessing, and/or other handling of bins 1 by load handlers 4 can be optimized, thereby saving costs in energy, wear and tear on automated and other machinery, etc.

Moreover, load handlers 4 and other components of (sub)systems 30, including control components thereof, may be specially configured for handling containers 1 comprising bulky item(s) 22. For example, as previously noted, further improvements in cost and efficiency may be realized by storing bins 1 comprising pre-picked bulky items 22 in segregated storage facility(ies). Such facilities may be segregated from storage used for other items in any suitable form and manner. For example, such storage may be physically separated from other storage, as for example by provision of an entirely separate free-standing or other stacked storage grid 2, shelving system, etc.; and/or it may be logically segregated from other storage in a grid 2 by, for example, being located in one or more regions within a storage grid 2 that are associated with reduced or otherwise relatively lower operational, maintenance, or real estate cost(s).

It has been determined, for example, that pre-packaging of bulky item(s) 22 in a grocery-order fulfillment system 250 decreased the item handling time(s) required for packing the item from stage 202 in FIGS. 1a, 1b to stage 208 from approximately 20 seconds to approximately 7 seconds.

As will be appreciated by those skilled in the relevant arts, once they have been made familiar with this disclosure, the pre-packaging of relatively bulky items 22 in bins 1, and subsequent addition of relatively smaller and/or otherwise less bulky items to such bins, may be accomplished in multiple iterations, so that for example the biggest & bulkiest items may be packed first, followed by any medium-sized items, and ultimately by any selected smallest items. As such persons will appreciate, such a graduated or iterated process can provide further efficiencies in packing, storage, and transportation costs.

In various embodiments, at least some pre-packed containers may be made by including two or more identical big & bulky items 22, so that when multiples of such items are ordered they may be readily retrieved and processed for further order assembly and delivery.

In the same and other embodiments, different types and/or sizes of big & bulky items 22 may be pre-packed together, so as to improve uniform weight handling, etc. For example, a heavy item 22 can be packed with one or more lightweight bulky items 22, so as to limit a number of bins 1 required to fill an order, and/or to facilitate later automated and/or manual handling.

In some examples, bins can be pre-packed with multiple bulky items 22 based on historical order data. For example, for customers who buy a particular package of toilet paper, if 81% purchase a single package, 14% buy two packages, 4% buy three packages, and 1% buy four packages; the system can be configured to proportionally pre-pack bins with one, two, three or four packages of toilet paper.

Similarly, if order data shows that single orders commonly include combinations of two or more different bulky items, such as bulk packages of soda and potato chips, the system can be configured to proportionally pre-pack bins with one or more of each type of bulky item.

Other pre-packing factors can include, but are not limited to space/grid restrictions, product turnover rates, product shelf-life(ves), order frequency, and traffic patterns among load handlers 4, conveyors 52, etc., in (sub)system(s) 30, 30, 50, 100, 250, etc.

Systems and methods in accordance with the disclosure may also be applied with advantage to the processing of refrigerated and other items which require special environmental conditions or other special handling. For example, in various embodiments bins 1 or other order containers comprising big & bulky items 22 can be inducted into a climate-controlled system 50, 100, for picking and addition of chilled or other specialty items, even when the big & bulky items 22 do not require refrigeration. This may, for example, reduce the total number of bins 1 or other order containers required to fulfill customer orders, and thereby maximize the efficiency of picking, transportation, and other handling processes. Additional advantage may be realized through improved balancing of chilled and ambient (i.e., non-chilled) order containers.

Similarly, items requiring warm or hot temperature control, humidity control, dust control (clean environments) and the like may be handled specially in accordance with the principles disclosed herein.

As will be further understood by those skilled in the relevant arts, significant advantage may be realized through the full or partial automation of processes 200 described above. Such automation may be implemented by, for example, providing automated controllers for load handlers 4, conveyors, and other components of systems 100, 30, 40, 50, etc. Such automation may be provided in any suitable manner, including for example the use of automatic data processors executing suitably-configured, coded, machine-readable instructions using a wide variety of devices, some of which are known and others of which will doubtless be developed hereafter. Processor(s) suitable for use in such implementations can comprise any one or more data processor(s), computer(s), and/or other system(s) or device(s), and necessary or desirable input/output, communications, control, operating system, and other devices, including software, that are suitable for accomplishing the purposes described herein. For example, a general-purpose data processor provided on one or more circuit boards will suffice.

Figure 5:
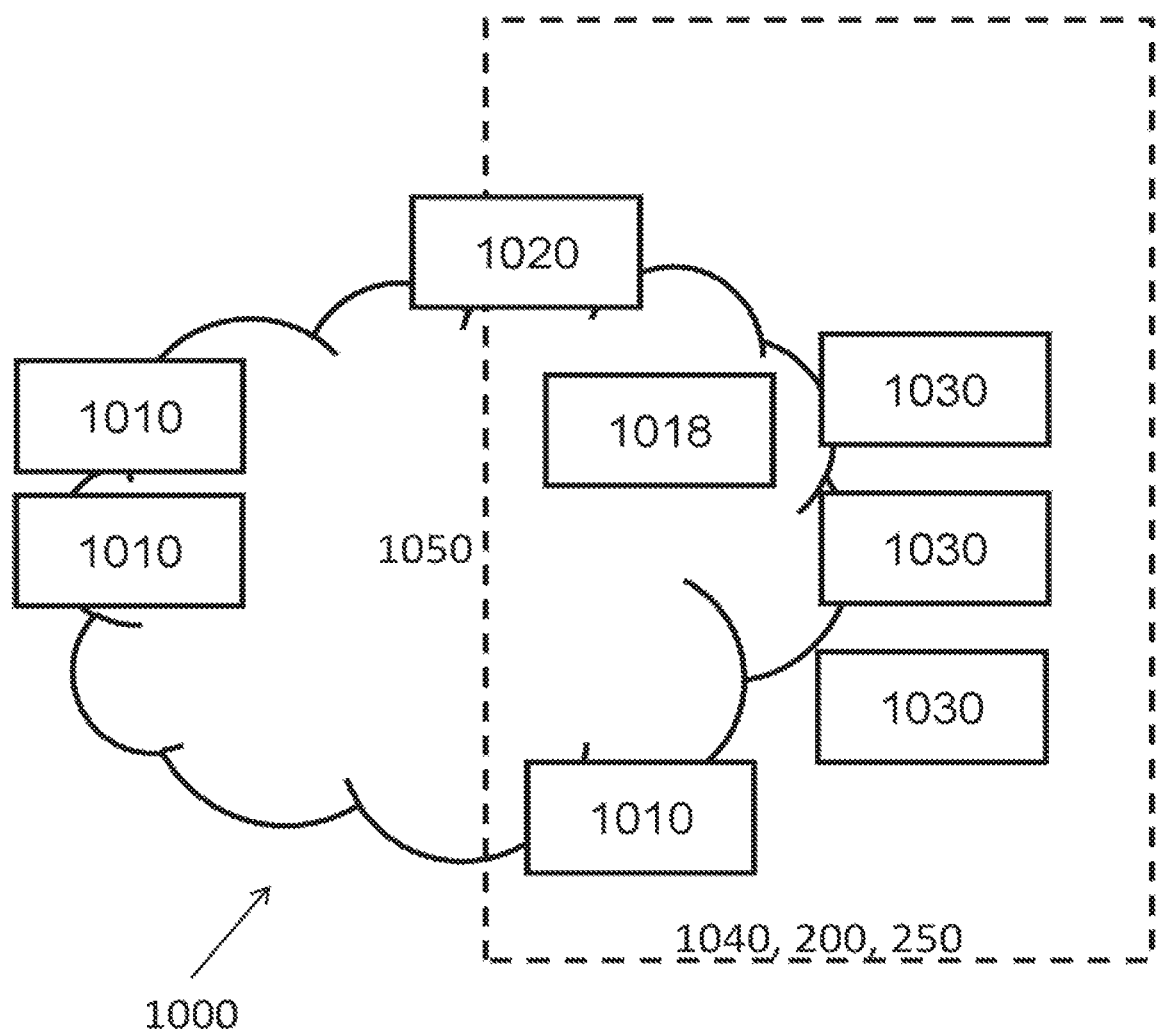
FIG. 5 is a schematic diagram illustrating aspects of an example system suitable for use in implementing aspects of the invention.

FIG. 5 shows an example system 1000 which may be suitable for implementing aspects of an order processing system. In the example embodiment shown, system 1000 includes one or more order processing devices 1020 associated with an online, telephone, mail, and/or other in-person or remote order shopping system; one or more order processing systems 1040, 200, 250, one or more client devices 1010, one or more control systems 1030, one or more order processing devices 1020, and database(s) 1018.

Order processing device(s) 1020 can include any one or more of servers, general purpose computers, local and/or mobile computing devices, control systems, or any other suitable devices suitable for use in implementing system(s) and/or method(s) in accordance with this disclosure. Such device(s) 1020 can, for example, be implemented as centrally-operated enterprise servers, and/or as locally-implemented kiosk(s) or control devices at storage facilities such as those described herein.

An order processing device 1020 suitable for use in implementing the invention can include any one or more processor(s), memory(ies) and/or communication module(s) configured to perform the methods and operations described herein. Such order processing device(s) 1020 can be configured to receive and process data and/or other signals representing order(s) placed with a vendor.

Order item information, customer information, inventory information, item information, or any other information pertinent to the system 1000 may be stored in one or more datastores 1018 at one or more of the order processing device(s) 1020 or otherwise accessible to the order processing device(s) 1020 via one or more communication networks 1050 otherwise.

In some examples, order processing device(s) 1020 can be configured to receive, access, analyze, update, monitor, aggregate or otherwise utilize order information, inventory information, customer information, item information, and the like.

The client devices 1010 may be any electronic device capable of submitting order information to the order processing device(s) 1020 such as a personal computer, laptop, tablet computer, mobile phone, personal digital assistant, terminal at a retail location, terminal at an order processing facility or office associated with the retailed, an automated or semi-automated telephone device, and the like. The client device(s) may be configured to communicate with the order processing device(s) 1020 via one or more communication network(s) 1050.

Communications means suitable for use in implementing systems in accordance with the invention can include any combination(s) of public, private networks and/or other communications devices or components. In some examples, the communications network(s) 150 can include any combination of wired, wireless or other networks and may span any desired and/or otherwise suitable number of service providers.

Control system(s) 1030 can include one or more processor(s), memory device(s), and communication system(s)/device(s) for controlling any number of robots, conveyors, picking devices, and/or other mechanisms or devices at one or more aspects of one or more order processing system(s) 250. For example, the processor(s) can be configured to communicate with and/or control/instruct load handlers, conveyors, lifts and/or any other devices for transporting, storing and/or retrieving bins, pallets, items etc. to and from pallet storage 70, pick station(s) 30, 100, 50, storage and retrieval system(s) 40, 100, order picking system(s) 100, 50, vehicle loading 60, and/or any other aspects of the system. The control system(s) 1030 can, in some examples, include wired and/or wireless communication networks for communicating with the various devices.

While illustrated as separate boxes in FIG. 5, the order processing device(s) 1020, control system(s) 1030, client device(s) 1010, database(s) 1018, and any other aspect of the system 1000 (illustrated or not) can be combined or distributed across any number of physical and/or logical locations, devices, and/or systems. For example, the example system(s) and/or method(s) described herein may be performed by a single system or device, or may be performed across multiple systems and/or devices. References to processor(s), device(s) and/or system(s) may applied or implemented by any processor, device and/or system within any device and/or system in the system as a whole 1000 irrespective of its physical or logical location.

Figure 6:
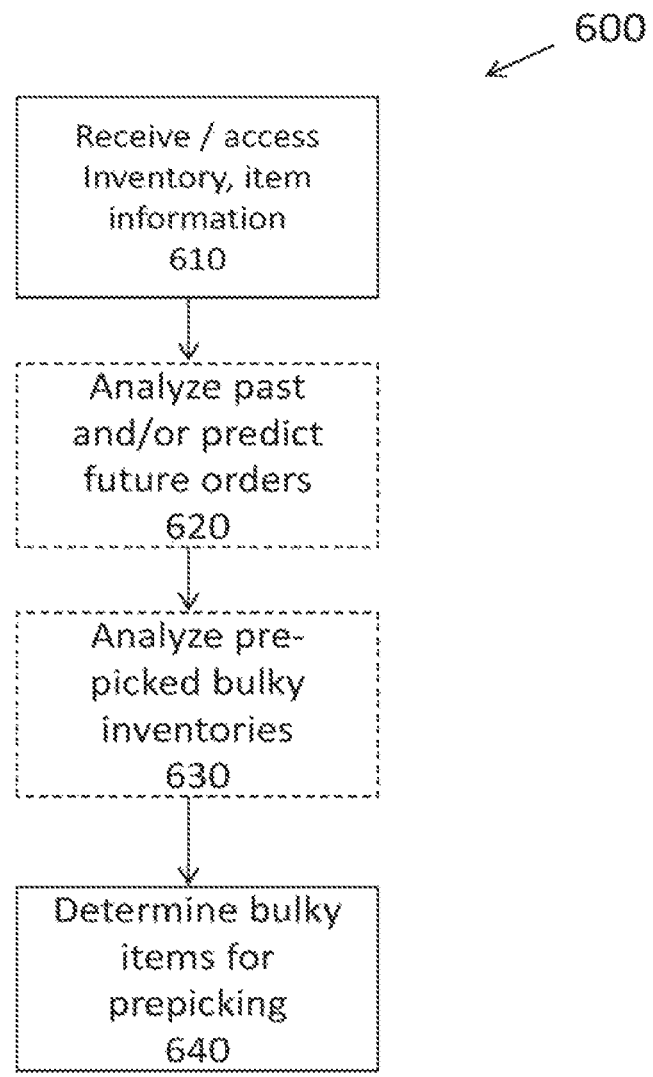
FIGS. 6 and 7 are flow diagrams illustrating aspects of example processes suitable for use in implementing aspects of the invention.

FIG. 6 illustrates an example method 600 for identifying items for prepacking. At 610, one or more processors at the order processing device(s) 1020 and/or control system(s) 1030, or elsewhere, can be configured to receive or access inventory and item information. For example, the processor(s) can be configured to receive or access item information such as item name, item description(s), item categories and/or classifications, item size/dimensions, item weight, item identifiers (unique identifier codes, SKUs, barcode, tags, RFID codes, etc.) and/or other item related characteristics such as perishability/expiry dates, any environmental control requirements (e.g. frozen, chilled, flammable, etc), item fragility, item tendency to topple or move around in a bin, etc. This information may be received or accessed upon receipt of a new shipment of items being received at the system 200, 250, upon a periodic or manually-triggered inventory update or review process, or otherwise.

The information may include inventory information such as a quantity of items to be inducted into the system, a quantity of pre-packed items stored in the system, and a quantity of items (not pre-packed) stored in the system.

In some examples, item and/or inventory information can be received or accessed from one or more databases, memories, and/or other data storage devices. For example, data storage device(s) can include item information for all items currently and/or previously stored in the storage-and-retrieval system, as well as items never stored in the storage-and-retrieval system.

In some examples, item and/or inventory information can be received or accessed from online resources, manufacturer/supplier databases or websites, data associated with incoming shipments or invoices, data imported from computer-readable media, data inputted manually, and/or any other electronic, networked, and/or manually-entered source. In some instances, information initially received or accessed manually or from an outside source can be stored in local or networked data storage device(s) for current or future reference.

At 640, the processor(s) can be configured to identify or determine whether and how many incoming items should be classified as bulky and prepacked into bins. These incoming items may be new items which have not been previously introduced to the system, or items which are being restocked.

In some examples, the processor(s) can be configured to implement, access or control a coordinator and/or an analytics engine which utilizes any number of defined parameters to determine items and quantities to be prepacked. In some examples, the coordinator and/or analytics engine can be implemented in hardware, software, and/or any other form. In some embodiments, the coordinator and/or analytics engine may be distinct modules; however, in other embodiments, the coordinator and/or analytics engine may be indistinguishable aspects of the system which are implemented by the processor(s) or other components. The examples below describe aspects of the analytics engine; however, these aspects can be similarly applied to or implemented by one or more processor(s), controller(s) and/or other devices in the system.

In some examples, a determination of items to be prepacked may consider efficient use of space, reduced risk of product damage, overhead of extra bin usage and/or any number of other considerations. In some examples, this determination may be based on one or more aspects of the item information.

The analytics engine may be configured to identify the bulkiest items for prepacking. In some examples, this may include ranking or otherwise generating a list which ranks, identifies or orders all items in the system based on their bulkiness. This may include considering and/or comparing the weight and/or dimensions of the items. In some examples, the analytics engine may generate a list/ranking for the items based on size, and a separate list/ranking for the items based on dimensions. In the same or other examples, the analytics engine may generate a list/ranking for the items based on a formula which generates a bulkiness value based on a weighting the item weight, volume, dimension(s) and/or any other parameters.

The processor(s) can, in some example embodiments, be configured to remove or exclude items from the potential bulky item list based on the received or accessed item information. For example, the processor(s) can be configured to remove of exclude items which do not exceed a defined weight, volume or length threshold (e.g. to be classified as bulky and potentially prepacked, items may have to weigh over 5 kg, have a volume of over 8000 cubic centimeters, and/or have a maximum dimension of over 100 cm). In another example, the processor(s) can be configured to remove or exclude items which have a remaining shelf life of less than a defined threshold (e.g. items which expire or have a "best before" date within 30 days). In another example, the processor(s) can be configured to remove or exclude items which may be unsuitable for prepacking (e.g. items which are toxic or flammable). In another example, the processor(s) can be configured to remove or exclude items which may not be suitable for storing in the environmental conditions of the storage area designated for bulky items (e.g. items with temperature, humidity sensitivities). The processor(s) can be configured to consider and utilize any combination or subset of these factors or other information in the received or accessed item information.

With a list/ranking of potential bulky items, the analytics engine can be configured to select the top X number of items from the list(s) as bulky items for prepicking. In some examples, the number of items X selected from the top of the list may be determined based on a predicted demand which may depend on pest order histories and/or predicted future orders, determination(s) of the storage and handling costs, and/or any considerations described herein or otherwise.

The analytics engine can be configured to determine a quantity bins to be prepacked with the bulky item. This quantity can be different or the same for each of the bulky items. In some examples, the quantities may be based on past and/or future order information, storage costs, expiry dates and/or any other considerations described herein or otherwise.

Identifying too many items for prepacking and/or prepacking too many bins can, in some examples, result in extra storage costs in the system 1000, or may result in unpacking prepacked bins. In some examples, the analytics engine can be configured to balance gains in prepacking efficiencies with storage costs and risks of spoilage or excessive times to sell through the prepacked bins.

In some examples, having too many prepacked bins may result in delivering an additional number of containers to a customer and/or having too much empty space within a container to be shipped to a customer. This may result in increased shipping costs, increased damage to items during shipment, increase in requirements to repack shipment containers, and/or decrease in quality of customer experience.

In some example systems, it has been observed that bulky items are ordered as single units less than 50% of the time. Accordingly, the analytics engine can be configured to determine whether two or more of the same bulky item should be prepacked in a single bin, and how many bins should prepacked with multiples. This can be based on any combination of the factors described herein as well as historical, seasonal or otherwise predicted demand for orders which include two or more of the same bulky item.

Additional example considerations for the analytics engine when making these multiples determinations can include weight, volume and/or length restrictions of bins/shippers; potential damage; unequal distribution across bins within a single order; etc. In some examples, the analytics engine can determine how many units of a bulky item should be prepacked, and the number of bins which should be prepacked based on predicted frequencies/volumes of orders including multiple units of the bulky item. In some examples, predicted frequencies/volumes can include considerations of received and/or prospective orders including multiple units of the bulky item.

In some examples, the analytics engine can also be configured to determine whether two or more different bulky items should be prepacked in a single bin based on any combination or subset of the factors described herein.

At 620, the analytics engine may be configured to analyze or otherwise consider past and/or future order information in making the determination(s) described herein. For example, the analytics engine can be configured to determine frequently ordered items.

In some examples, the analytics engine can be configured to identify or select items which appear in orders with an average frequency and/or volume over a defined threshold or relative to the order frequencies/volumes of other items (e.g. items which have sales volumes over 500/day, items which appear in greater than 5% of orders, items which are in the top 100 by volume/frequency). In some examples, frequencies and/or volumes can be measured/calculated over different periods of time (e.g. daily, weekly, biweekly, monthly, yearly). The determination of frequently ordered items can be determined dynamically, such as on a rolling basis and/or based on historical order data for the same season or time of year.

The analytics engine can, in some examples, only identify or select bulky items for prepacking from a most frequency ordered item list. In some examples, the analytics engine can be configured to generate a prepacking value for item(s) based on their order frequency/volume, predicted demand, and/or item characteristics (size, weight, etc). This prepacking value may be used to determine whether and how many of an item should be prepacked.

In some examples, based on past order histories and information regarding the items which are commonly sold together, the analytics engine may determine that identifying/selecting X number of items for prepacking may result in Y extra totes per shipment. For example, in some scenarios, it has been estimated that identifying and storing one hundred (100) different items for prepacked bins in the system 1000 may result in approximately 0.01 extra containers per customer shipment, while storing three hundred (300) items in prepacked bins may result in 0.07 extra containers per customer shipment.

In some embodiments, the analytics engine can be configured to determine bulky items for prepicking additionally or alternatively based on orders which have been received but have not yet been filled. In some examples, considering these orders can provide additional certainty to the prediction of upcoming demand for the prepacked containers by the picking stations.

In some embodiments, the analytics engine can be configured to determine bulky items for prepicking additionally or alternatively based on recurring orders, or orders which have not yet been placed (e.g. customer has items in a virtual shopping cart, etc.). In some examples, these future or prospective orders can provide slightly more certainty to the prediction of upcoming demand for the prepacked containers by the picking stations.

In some examples, the analytics engine may be manually or dynamically configured to change the number of prepacked items to try to attain a target Y extra containers per customer delivery. Alternatively or in addition to this, the analytics engine may be configured to weigh these values against storage costs, picking times, damage rates, and/or any other single or combination of variables.

In some examples, future order requirements may be estimated based on past ordering trends. The analytics engine may be configured to consider these trends when determining which items, how many items, and/or quantities of items to prepack. These considerations may include order trend information, projected growth/reduction in these trends, seasonal tendencies, and the like.

In some examples, the analytics engine may be configured to make any of the determinations described herein based on customer demographics and/or location of the system 1000. For example, customers serviced by one system 1000, 1030, 1040 may have different purchasing preferences/tendencies/patterns than customers serviced by another system 1000, 1030, 1040. This can, in some examples, be based on demographical, cultural, seasonal, historical, or any other information.

The analytics engine may be configured to update order trends, inventories, and any other information dynamically as new orders are placed, and as feedback and/or efficiencies/inefficiencies are observed in the system 1000. These observations may be manual observations, or may be based on automatically measured parameters such as numbers of extra shipment containers in an order, amount of unused space in a shipment container, order picking times, etc.

At 630, the analytics engine may be configured to analyze or otherwise consider current inventories and/or space availabilities/usage in the system when determining whether incoming items should be prepacked. Upon prepacking or order picking/dispatch, the inventories of the prepacked items can be updated.

For example, if the analytics engine determines that a large number of prepacked bins containing a particular item are in storage, the analytics engine may determine that a smaller number or no incoming units of the particular item should be prepacked. Conversely, if the analytics engine determines that too few prepacked bins containing a particular item are in storage, the analytics engine may determine that a larger number of incoming units of the item should be prepacked.

In some examples, the analytics engine can determine the number of bins to be prepicked based on the resulting storage space requirement and the available storage space in the system.

Irrespective of the above, the analytics engine can be configured to determine what incoming items (new or restocking, e.g. see 202 in FIG. 1a, 1b) are to be prepacked based on any combination or subset of the factors described herein.

In view of the above, and the balance of this disclosure, the determination or identification of bulky items for prepacking (including the selection of items for prepacking, the number of prepacked items per container, and/or the quantity of containers to prepack with the item(s)) can be based on item information/characteristics, inventory information, and/or predicted demand for the items as described herein.

Upon identification/selection and determination of the quantities of bulky items to be prepacked, the processor(s), via a coordinating module or otherwise, can be configured to coordinate the prepacking of the items for prepacking.

Figure 7:
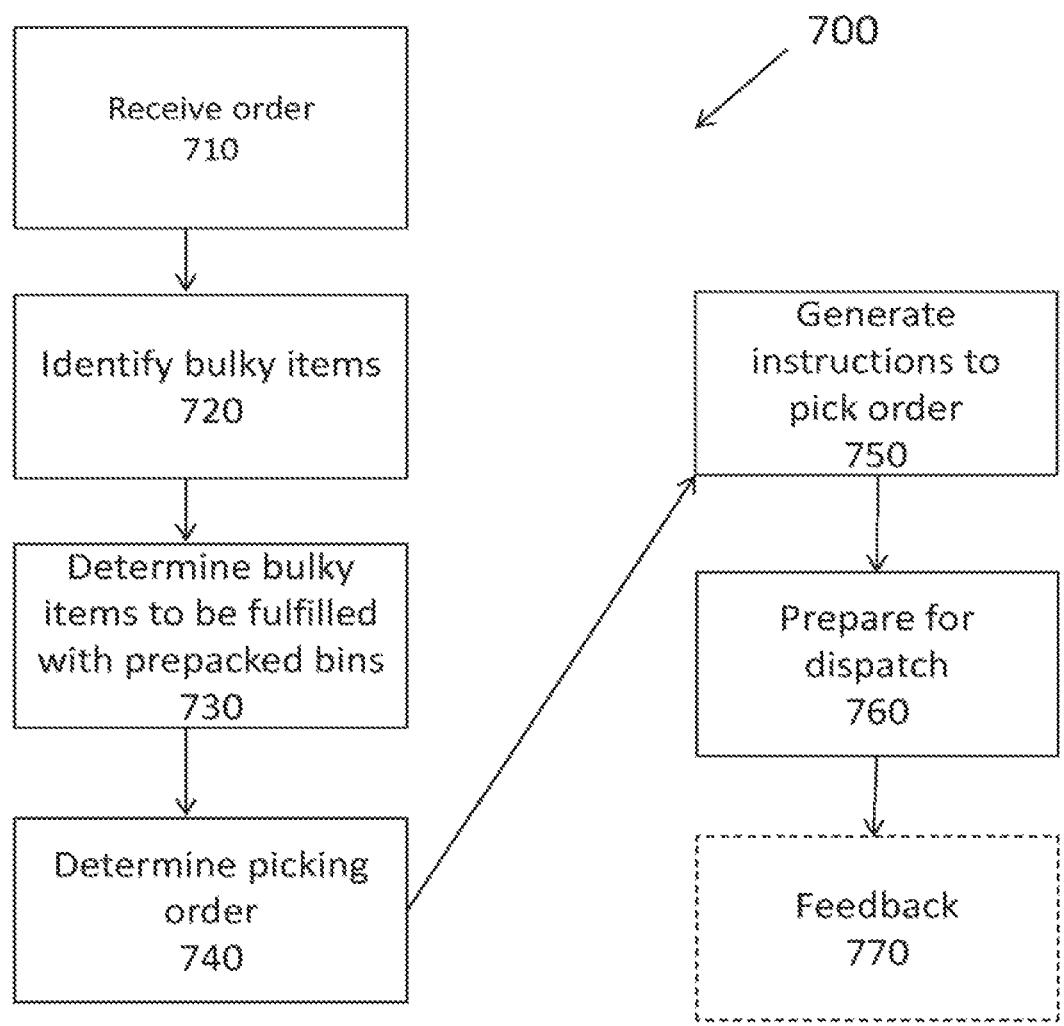

FIG. 7 shows an example method 700 of an order fulfillment process. At 710, the processor(s) may receive information regarding an order to be fulfilled/picked. The order information may include a list of items, the quantity of items, customer preferences, shipment destination information, and/or any other information. At 720, the processor(s) can be configured to identify from the order information, items which are bulky and have been prepacked into bins.

At 730, the processor(s) can be configured to determine how many of the bulky item(s) should be fulfilled using prepacked bins. As described herein, utilizing too many prepacked bins may result in an excess number of shipment containers per order, and/or may result in excess unused space in a container.

In some examples, an order or customer preference may include information which limits the number of containers to use. For example, a customer may request that the fewest number of bins possible be used. This information may be stored in the order information or in a customer profile storage at the system.

In some examples, it has been estimated that a balance of efficiencies (cost, space, picking time, etc.) may be realized when one third to one half of all customer totes are initiated using prepacked bins.

At 740, the processor(s) can be configured to determine a sequence for picking the order. This may be determined separately or in conjunction with 730. In some examples, by initiating picking into a bin having a bulky item, the sequencing of items may be simplified since the effect of the sequencing shows diminishing returns as the items get smaller.

In some examples, the processor(s) can be configured to evaluate 730 and 740 based on weight distributions across different containers. For example, based on the items in the order, in some examples, the processor(s) can be configured to separate heavy items from delicate items. In some examples, the processor(s) can be configured to limit the number of heavy items in a single container based on delivery weight restrictions. In some examples, the processor(s) can be configured to distribute weight as evenly as possible across bins in an order.

In some examples, using additional prepacked bins can allow for multiple order bins to be picked simultaneously. This consideration may be important for expedited, delayed or otherwise time-sensitive orders.

The processor(s) can be configured to determine 730 and 740 based on which items can be accommodated within the same bin based, for example, on item sizes, item temperature or other environmental requirements (e.g. chilled, insulated containers, cleaning supplies not to be stored with food items, etc.), etc.

In some examples, the processor(s) can be configured to determine 730 and 740 based on load handler and/or picker workloads, congestion and/or backlogs.

Any combination of these or other considerations can be applied by the processor(s).

At 750, based on the above, the processor(s) can be configured to generate instructions to instruct/control load handlers, pickers, conveyors, and any other aspect of the system to retrieve, pick and otherwise assemble items into bins for an order. At 760, the order bins can be prepared for dispatch.

At 770, the system 1000 can be optionally configured to generate, measure and/or communicate feedback to the processor(s) for improving efficiencies and/or customer experience. In some examples, the system can be configured to measure or determine picking/order fulfillment times, prepacked storage usage, unused space in shipment containers, financial costs, time costs, storage costs and the like. In some examples, the system can be configured to receive signals representing customer feedback information such as customer satisfaction, order damage, etc. This feedback information may be used to dynamically improve any of the factors, targets and/or methods described herein.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

What is claimed is:

1. An order fulfillment system comprising:
a storage facility, for storage of a plurality of pre-packed bins, each having one or more pre-picked bulky items pending picking of an order containing at least one other item stored in a storage and retrieval system; and
a retrieval and picking system configured to:
place, via one or more controllable mechanisms, one or more pre-picked bulky items into at least one of the pre-packed bins;
access, by a processing device, data stored in a storage device on a network, the accessed data identifying a plurality of virtual shopping carts of respective consumers, each virtual shopping cart representing a potential order of items;
predict, in at least one processor of the processing device, demand for additional items based on at least the potential order of items in the accessed data;
retrieve, by the one or more controllable mechanisms, pre-packed bins and enable placement therein of one or more of the additional items from the storage and retrieval system based on the predicted demand;
deliver, by the one or more controllable mechanisms, packed bins containing the bulky and at least one other additional item to a dispatch facility.

2. The order fulfillment system of claim 1 comprising: the at least one processor configured to:
determine whether any of a plurality of incoming items will be pre-picked at a facility placing pre-picked bulky items in containers based on received or accessed information associated with incoming items.

3. The order fulfillment system of claim 2 wherein the at least one processor is configured to:
determine whether any of the plurality of incoming items will be pre-picked based on the predicted demand for incoming items.

4. The order fulfillment system of claim 3 wherein the predicted demand is based on received orders which include incoming items.

5. The order fulfillment system of claim 3 wherein the predicted demand is based on historical order data and is periodically updated based on new orders.

6. The order fulfillment system of claim 2 wherein the at least one processor is configured to:
   determine whether any of a plurality of incoming items will be pre-picked based on inventory information associated with incoming items.

7. The order fulfillment system of claim 2 wherein the received or accessed information associated with incoming items includes at least one of: an incoming item weight, an incoming item volume, an incoming item dimension.

8. The order fulfillment system of claim 1 at least a part of which is environmentally controlled.

9. The order fulfillment system of claim 1, wherein the storage facility is physically separate from the storage and retrieval system.

10. The order fulfillment system of claim 1, wherein the storage facility comprises:
   at least one logically segregated portion of the storage and retrieval system.

11. The order fulfillment system of claim 2 wherein the at least one processor is configured to:
   receive information regarding submitted order to be fulfilled; and
   determine whether pre-picked bulky items are to be retrieved from the storage facility to fulfill the submitted order.

12. A method of handling items in at least a semi-automated order fulfillment system, the method comprising:
   accessing, by a processing device, data stored in a storage device on a network, the accessed data identifying a plurality of virtual shopping carts of respective consumers, each virtual shopping cart representing a potential order of items;
   predict, in at least one processor of the processing device, demand for additional items based on the accessed data;
   identifying, in the at least one processor of the processing device, bulky items for prepacking from the additional items based on the predicted demand;
   generating, in the at least one processor of the processing device, a signal for controlling one or more moveable mechanisms in the order fulfillment system to access the identified bulky items for pre-pocking;
   storing, by the one or more moveable mechanisms, at least one identified bulky item in each of at least one bin, prior to storing any relatively less bulky item therein, to form at least one pre-packed container;
   placing, by the one or more moveable mechanisms, the at least one pre-packed container in storage; and
   upon receipt of a submitted order containing a request for the at least one prepacked bulky item and at least one non-bulky item:
      retrieving, by the one or more moveable mechanisms, one of the at least one pre-packed containers;
      using an order picking system, adding the at least one non-bulky item to the retrieved pre-packed container; and
      providing, by the one or more moveable mechanisms under control of the one or more processors of the processing device, the retrieved pre-packed container containing the at least one non-bulky item to a dispatch facility.

13. The method of claim 12, wherein identifying the bulky items for pre-packing is based on at least one physical characteristic of an item, and on the predicted demand for the item.

14. The method of claim 12, comprising: storing a plurality of identified bulky items in each of the at least one bin or other container to form the pre-packed container.

15. The method of claim 14, wherein the plurality of bulky items is substantially identical.

16. The method of claim 12, wherein the at least one identified bulky item is heavier or larger than the at least one non-bulky item.

17. The method of claim 12, wherein the storage is physically separated from storage in which the at least one non-bulky item is stored prior to picking.

18. The method of claim 12, wherein the storage is logically separated from storage in which the at least one non-bulky item is stored prior to picking.

19. The method of claim 12, wherein the storage is environmentally controlled.

20. The method of claim 12, performed at least partially by a processor of an automatic control system.

* * * * *